United States Patent
Reid

(10) Patent No.: US 6,950,653 B2
(45) Date of Patent: Sep. 27, 2005

(54) SCANNING TONE REMOTE ADAPTER FOR LAND-MOBILE RADIO DISPATCH FOR USE WITH DISPERSED DISPATCH STATIONS

(75) Inventor: Jeffrey Turner Reid, Sinking Spring, PA (US)

(73) Assignee: Hubbell Incorporated, Orange, CT (US)

(*) Notice: Subject to any disclaimer, the term of this patent is extended or adjusted under 35 U.S.C. 154(b) by 242 days.

(21) Appl. No.: 10/335,988

(22) Filed: Jan. 3, 2003

(65) Prior Publication Data

US 2003/0134633 A1 Jul. 17, 2003

Related U.S. Application Data

(60) Provisional application No. 60/346,900, filed on Jan. 11, 2002.

(51) Int. Cl.[7] .............................. H04Q 7/20; H04M 1/00
(52) U.S. Cl. ....................... 455/423; 455/67.11; 455/68; 455/426.2; 455/507; 455/554.2
(58) Field of Search ................................. 455/423, 424, 455/425, 426.2, 9, 23, 507, 509, 510, 516, 518, 520, 512, 526, 67.11, 68, 554.2; 379/1.01, 9, 10.01, 15.01

(56) References Cited

U.S. PATENT DOCUMENTS

| | | | |
|---|---|---|---|
| 3,403,341 A | | 9/1968 | Munch |
| 3,898,390 A | * | 8/1975 | Wells et al. ................ 455/438 |
| 4,166,927 A | | 9/1979 | Hamaoki |
| 4,184,118 A | | 1/1980 | Cannalte et al. |
| 4,400,585 A | | 8/1983 | Kaman et al. |
| 4,554,542 A | | 11/1985 | Dolikian |
| 4,612,415 A | | 9/1986 | Zdunek et al. |
| 4,654,881 A | | 3/1987 | Dolikian et al. |
| 4,682,367 A | * | 7/1987 | Childress et al. ............. 455/17 |
| 4,841,302 A | | 6/1989 | Henry |
| 4,905,302 A | * | 2/1990 | Childress et al. ........... 455/515 |
| 4,939,746 A | * | 7/1990 | Childress .................... 455/509 |
| 5,046,126 A | | 9/1991 | Ingram |
| 5,077,828 A | * | 12/1991 | Waldroup .................... 455/514 |
| 5,117,501 A | * | 5/1992 | Childress et al. .......... 455/11.1 |
| 5,125,101 A | | 6/1992 | Johnson et al. ................ 455/9 |
| 5,125,102 A | * | 6/1992 | Childress et al. .............. 455/9 |
| 5,241,689 A | | 8/1993 | Schwed et al. |
| 5,262,769 A | | 11/1993 | Holmes |
| 5,369,783 A | * | 11/1994 | Childress et al. ............. 455/17 |

(Continued)

FOREIGN PATENT DOCUMENTS

| | | | |
|---|---|---|---|
| EP | 0748137 | 12/1996 | ............ H04Q/7/22 |
| WO | 9849842 | 11/1998 | ............ H04Q/7/00 |

OTHER PUBLICATIONS

MOTOROLA, "R2600 Series Communications System Analyzers" pp. 1–15, © 2001.

"MPT 1306 Code of Practice", pp. 1–14, Oct. 1996.

*Primary Examiner*—Binh K. Tieu
(74) *Attorney, Agent, or Firm*—Stacey J. Longanecker; Alfred N. Goodman; Mark S. Bicks

(57) ABSTRACT

A land mobile radio dispatch system is provided, which comprises a radio, one or more remote dispatch devices, and a scanning tone remote adapter connected to the radio and the remote dispatch devices, and is adapted to receive tonal signals from the remote dispatch devices. The dispatch system provides scanning of RF channels, control from remote locations, and parallel updating of multiple dispatch devices, including changing the channel or the base station and notifying other dispatch devices of the current channel-in-use. The tonal signals indicate either an action taken, or an action desired to be taken by the remote dispatch devices. The scanning tone remote adapter is further adapted to transmit received tonal signals to remote dispatch devices, which can indicate the status of the radio, or requested commands by other remote dispatch devices.

35 Claims, 5 Drawing Sheets

U.S. PATENT DOCUMENTS

| | | | |
|---|---|---|---|
| 5,440,759 A | * | 8/1995 | Barnes et al. ................. 455/15 |
| 5,481,545 A | | 1/1996 | Maedjaja et al. .......... 370/95.1 |
| 5,548,810 A | | 8/1996 | Riddell et al. |
| 5,761,622 A | * | 6/1998 | Priest .......................... 455/522 |
| 5,784,388 A | | 7/1998 | Knox |
| 5,790,527 A | * | 8/1998 | Janky et al. ................ 370/330 |
| 5,799,254 A | | 8/1998 | Karmi et al. |
| 5,857,144 A | * | 1/1999 | Mangum et al. ........... 455/11.1 |
| 5,864,752 A | | 1/1999 | Pinder |
| 5,864,762 A | * | 1/1999 | Childress et al. ........... 455/509 |
| 5,930,729 A | | 7/1999 | Khamis et al. |
| 6,021,326 A | | 2/2000 | Nguyen |
| 6,141,347 A | | 10/2000 | Shaughnessy et al. ...... 370/390 |
| 6,148,064 A | | 11/2000 | Christensen et al. ..... 379/88.12 |
| 6,215,991 B1 | | 4/2001 | Mou et al. |
| 6,289,202 B1 | | 9/2001 | Kikuchi |
| 6,323,784 B1 | | 11/2001 | Miyashita |

\* cited by examiner

SCANNING TONE REMOTE ADAPTER FOR LAND-MOBILE RADIO DISPATCH FOR USE WITH DISPERSED DISPATCH STATIONS

This application claims benefit under 35 U.S.C. § 119(e) from provisional patent application Ser. No. 60/346,900 filed on Jan. 11, 2002, the entire contents of which are incorporated herein by reference.

FIELD OF THE INVENTION

The invention relates to radio dispatch systems. More particularly, the invention relates to a system and method for communicating status information of a radio between one or more dispatch stations, and from a base station to one or more base stations, so that all users of the radio dispatch system have current information about the status of the radio.

BACKGROUND OF THE INVENTION

In land-mobile radio dispatch, there is the need for controlling a radio base station with a user-friendly device that is specific to the operating environment. Several methods for controlling a radio base station exist today with each having different limitations. These methods are described below after the following description of how a ratio base station generally operates.

FIG. 5 illustrates a block diagram of a conventional radio base station known to those skilled in the art of the invention. Radio base station 500 refers collectively to all the components shown in FIG. 5, which include a transceiver tower 502, a radio 504 (e.g., which comprises power transmission amplifiers, modulating and demodulating circuits, interface and power-control circuits, among others), an adapter 506, a local dispatch device (LDD) 510, and one or more remote dispatch devices (RDDs) 508a–508d. The operation of radio base station 500 is well known to those skilled in the art, but its salient features are mentioned herein as an aid in understanding the discussion below. Radio 504 transmits a modulated signal to transceiver tower 502, which then transmits a radio frequency signal to one or more distant transceivers (not shown). These distant transceivers can be used by police, fire, rescue, military or security personnel for which centralized communications is necessary or desired, or by assistants on a ranch, or by employees of a large industrial manufacturing or warehouse facility, among other uses. Regardless of the operating environment, it is be desirable and/or necessary to maintain two-way communication capability with the associated individuals. These associated individuals have two-way communication devices (i.e., transceivers) that can receive signals from and transmit to the transceiver tower 502 and radio 504.

Adapter 506 allows more than one dispatcher (i.e., a person who talks to the distantly located individuals with transceivers) to communicate over radio 504 and transceiver tower 502 to these individuals. Adapter 506 can control radio 504 based on commands received from a LDD 510, which can be co-located with the adapter 506, and RDDs 508a–508d. Adapter 506 receives the commands generated by the RDDs 508a–508d and/or LDD 510, prioritizes them, and translates them into signals that are understood by radio 504. Adapter 506 receives audio signals from RDDs 508a–508d and/or LDD 510 and sends them to radio 504, which modulates a carrier frequency (AM, FM, FSK, PSK, and so on) to transmit the audio signal on a desired frequency (or channel) to the distant transceivers.

When an RDD 508b controls the radio base station 500, it sends signals that directs the adapter 506 in its operation. The adapter 506 controls the radio 504 which, in turn, controls the transceiver tower 502. However, adapter 506 can also control RDDs 508a, 508c and 508d based on what RDD 508b has directed it to do. This is because, even in a typical "feature-less" radio base stations, transmitting on any one channel prevents other RDDs from transmitting on that same channel at the same time, even without bi-directional control signals, thereby controlling the entire radio base station.

In order of complexity, the methods of controlling a radio base station include: (1) local control; (2) direct current (DC) remote-control; (3) tone remote-control; and (4) digital control. Local control is characterized as a low cost, low functionality, direct connection between a controlling device such as a dispatch device and a radio using analog control information (i.e., analog signals) to control the radio. This system would not include an adapter, although the dispatch device can be several hundred feet from the radio. DC remote-control is characterized as more costly than methods (1) and (3), and provides more features than local control, but has limitations in functionality and in the type of circuit used to connect the controlling device to the radio. Tone remote-control is also characterized as more costly than method (1) but provides the most functionality and has the fewest limitations of the four methods of radio base station control. Tone remote-control is of interest in this environment due to its relatively high-level functionality, including parallel updating of multiple dispatch points and its ability to effectively provide control from remote locations (that might be many miles away) using a leased-line PSTN circuit.

In many applications, there is a need to control the radio base station from a remote location. For example, a typical radio dispatch environment might have a dispatch device located on the first floor of a tall building and a radio located on the roof. In this situation, local control may not be feasible due to the typical 1000-foot distance limitation of transmitting analog control information over copper wire and the size of the cable required to make the necessary connection. Furthermore, DC remote-control may prove insufficient due to its low level of functionality or the type of circuit available for the remote connection. For example, DC remote-control only supports four (4) channels of channel change (i.e., DC remote control is only capable of selecting 1 of 4 total number of channels), requires a DC continuous line between the dispatch device and the adapter (if there is one) or radio (which is currently, and for the foreseeable future, unavailable over leased PSTN lines), and cannot support parallel status updating among plural dispatch devices. Digital remote-control is a possibility, but it is expensive and requires sophisticated equipment.

In remote-control of a radio base station, several features are desirable. These include the following:

Activation of the radio transmit or push-to-talk (PTT) switch from a remote location;
Reception of the radio's receive audio;
Placing the radio in a monitor mode;
Changing the channel the base station is using; and
Dispatch awareness of the current state of the radio.

Most of these are features available to DC remote-control and tone remote-control. Local control does not support channel change. One additional feature of tone remote-control that usually makes it desirable over both DC remote-control and local control is the ability for parallel dispatch points to be updated to the current setting of the radio.

In many situations, a base station may have several dispatch points connected to it. These dispatch points are not necessarily co-located. For example, through the use of leased PSTN lines, a first dispatch point might be located in a campus security building, while a second dispatch point might be located in the campus administrative office building. If each dispatch point has parallel status update capability, changing the channel of the base station at a first dispatch point will change the current channel-in-use indication at other dispatch locations. This is an important feature that provides the dispatcher the assurance that the base station is in a known state. Without parallel status updating, a dispatcher may think the radio is on one channel when, in fact, it is on another.

Tone remote-control uses standard tones for both control and carrier signals. Control tones are used to change the radio channel, put the radio in monitor mode and activate the radio PTT. A carrier tone superimposed on the transmit-audio is used to keep the radio PTT activated for the duration of the dispatcher's transmission. These tones are superimposed on the audio so that only one pair of wires is required from the dispatch device (i.e., as opposed to two pairs if one pair were dedicated to audio and the other is for control signals) and the tone remote-control adapter. In some applications, these same tones are detected and decoded by parallel dispatch devices to provide parallel status updating.

Some radios are designed to scan the RF channels that are programmed into it. This allows a single radio to scan several RF frequencies that could be used in an application. If the radio detects a carrier signal on one of the channels, it typically stops and displays the selected channel. Depending on the radio's capabilities, it might only display a numeric indication (e.g., an LED associated with an F1, F2, F3 or F4 button) to indicate the selected channel. Other types of radios use an alias, for example, "FIRE" or "POLICE" on an LED. If a carrier signal has not been detected, the radio scans to the next channel and so on, until the end of the channel list is reached. The radio then scans the first channel on the channel list, and so on. There are several variations with regard to scanning. For example, some radios provide priority scanning and other features, but the basic operation is the same. There is a deficiency in many scanning radios in that they cannot provide the scanned channel information to an external device.

The ability to scan the RF channels in a conventional radio is an important feature. Many conventional radios (as opposed to trunk radios or scanning radios, which, by definition, must have scanning capabilities) do not have scanning capabilities. These conventional radios instead use an external device to change the channel of the radio to monitor different RF channels. While the external device tunes the radio to a specific channel, all other channel activity will be ignored until those channels are selected. Further, the cost of a system design that supports simultaneous monitoring of multiple channels may be prohibitive and is reflected in the cost of the dispatch device, the number of remote adapters required, the number of radios required and the installation of such a system. These non-scanning conventional radios would clearly benefit from a remote adapter to facilitate external scanning control.

Currently, several manufacturers provide tone remote-control devices and adapters that allow the radio channel to be changed from a distant location. Further, several conventional radio manufacturers provide radios that include the ability for external control of the radio's channel. Nevertheless, all of these conventional tone remote-control devices are unable to provide current channel-in-use information to a remote dispatch device.

Therefore, a need exists for a device that can provide remote control of a conventional radio using tone remote-control which can provide current channel-in-use information to one or more remote dispatch devices.

SUMMARY OF THE INVENTION

In accordance with the present invention, a novel scanning tone remote adapter is provided which obviates or minimizes problems of existing radio remote control devices described above.

It is an object of the present invention to provide a scanning tone remote adapter which may be advantageously used to communicate radio status information to one or more dispatch stations.

It is another object of the present invention provide a scanning remote tone adapter for use with dispersed stations that facilitates the sharing of radio commands issued by a dispatch station to be understood by all dispatch stations in the radio dispatch system.

The above described disadvantages are overcome and a number of advantages are realized by the present invention which relates to a land-mobile radio dispatch system which comprises a radio communication system (e.g., a radio and transceiver tower), a scanning tone remote adapter connected to the radio, one or more remote dispatch devices, and a network connecting the one or more remote dispatch devices to the scanning tone remote adapter. The scanning tone remote adapter is adapted to communicate with the one or more remote dispatch device's radio communication system via status signals and radio communication system command signals received from the one or more remote dispatch devices, and to provide the received radio communication system command signals to the radio communication system and the one or more remote dispatch devices.

The present invention further relates to a method of using the land-mobile radio dispatch system comprising the steps of, resetting an activity timer, selecting a first channel to scan, determining the presence of an RF carrier-present signal from a radio communication system, and generating an RF carrier-present status signal and ceasing scanning activity for a predetermined amount of time if the RF carrier-present signal is present, or, determining a next action based on received tone signals and activity timer status if no RF carrier-present signal is present.

BRIEF DESCRIPTION OF THE DRAWINGS

The novel features and advantages of the present invention will best be understood by reference to the detailed description of the preferred embodiments which follows, when read in conjunction with the accompanying drawings, in which.

DETAILED DESCRIPTION OF THE PREFERRED EMBODIMENTS

Figure 1:
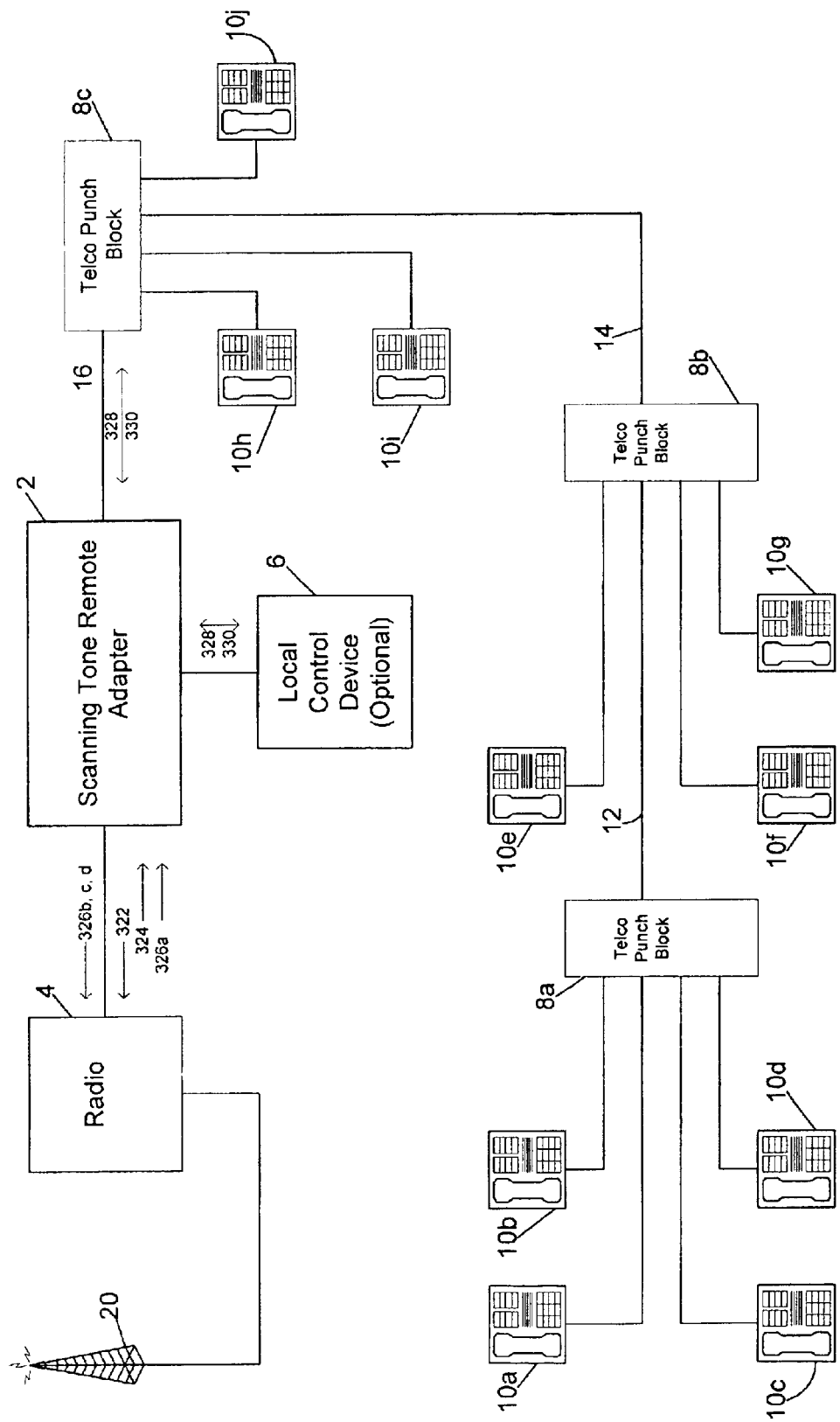
FIG. 1 illustrates a block diagram of a radio dispatch system constructed in accordance with an embodiment of the present invention.

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

FIG. 1 illustrates a block diagram of a radio dispatch system 100 in accordance with an embodiment of the present invention. Radio dispatch system 100 is preferably used in a land-mobile radio dispatch application, such as campus security at a college, university, or other large institution with a security force. Additionally, it can also be used at other facilities that require communications over significant distances or within a selected area such as in and around a building.

Radio dispatch system 100 comprises a scanning remote tone adapter 2, an optional local control device 6, a radio 4, a radio transmission tower 12, and can further comprise remote dispatch devices (RDDs) 10a–10j connected via telephone company punch blocks (punch blocks) 8a–8c. Local control device 6 is similar to the remote dispatch device 10 in that both have the capability to control radio 4, but, each has separate and additional capabilities, which will be discussed in detail below.

Generally, the radio dispatch system 100 allows a user at local control device 6 to establish two-way communications via modulated RF signals with other users, who are remotely located and equipped with transceiver radios (i.e., transceivers) that are turned to the same channel. A user of local device 6 can depress a push-to-talk (PTT) switch, thereby "keying" his or her microphone, and allowing the user's voice to be transmitted for reception at remotely located transceivers (not shown in FIG. 1). Radio 4 receives voice transmissions from these remotely located transceivers, and converts the received signals to an audible audio signal that the user of local control device 6 can listen to. The user of local device 6 can also change the channel to which the radio 4 is tuned, control the scanning of channels by the radio 4, and perform other allowable operations determined by the capabilities of radio 4 which will be discussed in detail below. Users of remote dispatch devices 10 can also transmit their voice and listen to received audio, and perform the same operations as the user of local control device 6; however, these operations are performed remotely through use of scanning tone remote adapter 2.

Punch blocks 8a–8c consolidate the lines that connect the remote dispatch devices 10a–10j to the adapter 2 or other upstream punch blocks 8a–8c. For example, each punch block 8 consolidates four lines into a single line. Punch block lines 12, 14 and 16 may be privately controlled wires (i.e., "in-house" wiring), or leased telephone lines. In that way, a remote dispatch device 10 can be remotely located from the scanning tone remote adapter 2 and yet communicate with it via ordinary leased lines. The lines from each remote dispatch device 10 can be a 2-wire or 4-wire line. These lines carry the control tone sequence signals between the remote dispatch devices 10, scanning tone remote adapter 2 and local control device 6. The lines and blocks can be collectively referred to as a network. This network can be comprised of interconnected pairs of wire, leased telephone lines or a local or wide area network (LAN, WAN). The various features of scanning tone remote adapter 2 will now be discussed.

Scanning tone remote adapter 2 preferably automatically controls the selection of channels by the radio 4. Scanning tone remote adapter 2 selects the radio channel at a programmed or pre-selected rate, which is also referred to as "scanning". Selection of a channel preferably occurs by outputting a series of control signals to radio 4, which radio 4 then interprets as an indication to tune its receiver to different channels. Radio 4 provides information signals (status signals) to the scanning tone remote adapter 2, which interprets those signals to determine the presence of activity, or lack thereof, on the currently tuned channel.

For example, if while scanning a plurality of channels, radio 4 finds an RF carrier on channel 6, it indicates this to scanning tone remote adapter 2. Additionally, scanning tone remote adapter 2 can direct radio 4 to tune to a selected channel, while scanning, for a programmed or pre-selected period of time when the RF carrier of a channel is detected. Since scanning tone remote adapter 2 is the controller of the scan feature, the channel that is currently selected when RF carrier detection occurs is known. When RF carrier detection occurs, scanning tone remote adapter 2 ceases scanning (e.g., for a pre-programmed period of time) and locks onto the channel, which is then referred to as the "scanned channel". This information can then be used by scanning tone remote adapter 2 to notify remote dispatch devices 10 of the current channel-in-use, or scanned channel.

In a preferred embodiment of the invention, a high-level guard tone (HLGT) is used. The HLGT is a 120 ms duration signal of 2175 Hz. Thereafter, one of the sixteen (16) function tones is sent. The function tones (control sequence tones) last 40 ms, and range from 1950 Hz to 550 Hz in 100 HZ steps. This is, of course, just one example of how the control sequence tones can be arranged, and different frequencies and durations are possible.

To provide the scanned channel information to remote dispatch devices 10, parallel status updating is utilized. Scanning tone remote adapter 2 takes advantage of tone remote-control parallel status updating by adding the ability to encode the tone-remote control tones within itself. This means that scanning tone remote adapter 2 can generate and encode a tone control sequence, which is then transmitted to all connected remote dispatch devices 10a–10j and local control device 6. Correspondingly, each remote dispatch device 10 is operable to substantially continuously or periodically look for a tone control burst generated by the scanning tone remote adapter 2. The start of a burst is indicated by the detection of the HLGT a high-level guard tone (HLGT). Once a HLGT is detected, remote dispatch device 10 then decodes a subsequent function tone, which indicates the channel to be selected. In this case, each connected remote dispatch device 10 has the same capabilities of scanning tone remote adapter 2 in that they can decode a tone control sequence indicating which channel has been selected.

When a remote dispatch device 10 selects (or attempts to select) a new channel, it generates a control tone sequence. Each connected remote dispatch device 10 receives and decodes this control tone sequence and updates its user interface accordingly to reflect the activity defined by the sequence of control tones. Thus, if remote dispatch device 10a selects channel 1, and outputs a control tone sequence indicating selection of channel 1, each networked remote dispatch device 10 receives the control tone sequence, and updates its user display interface accordingly (i.e., channel 1 has been selected by RDD 10a). Scanning tone remote adapter 2 also receives the control tone sequence, interprets it as a command to tune the radio 4 to a new channel and causes the radio to select the new channel (in this example, channel 1).

When requested by remote dispatch device 10 to cause the radio to scan the channels, scanning tone remote adapter 2 directs radio 4 to scan the channels. When radio 4 finds an RF carrier of a channel, and the channel is then subsequently selected (i.e., becomes the "scanned channel"), scanning tone remote adapter 2 then outputs a control tone sequence indicating selection of the scanned channel. Each networked remote dispatch device 10 capable of parallel status updating then decodes these tones (i.e., the control tone sequence) and updates its user interface to reflect the scanned channel.

Figure 2:
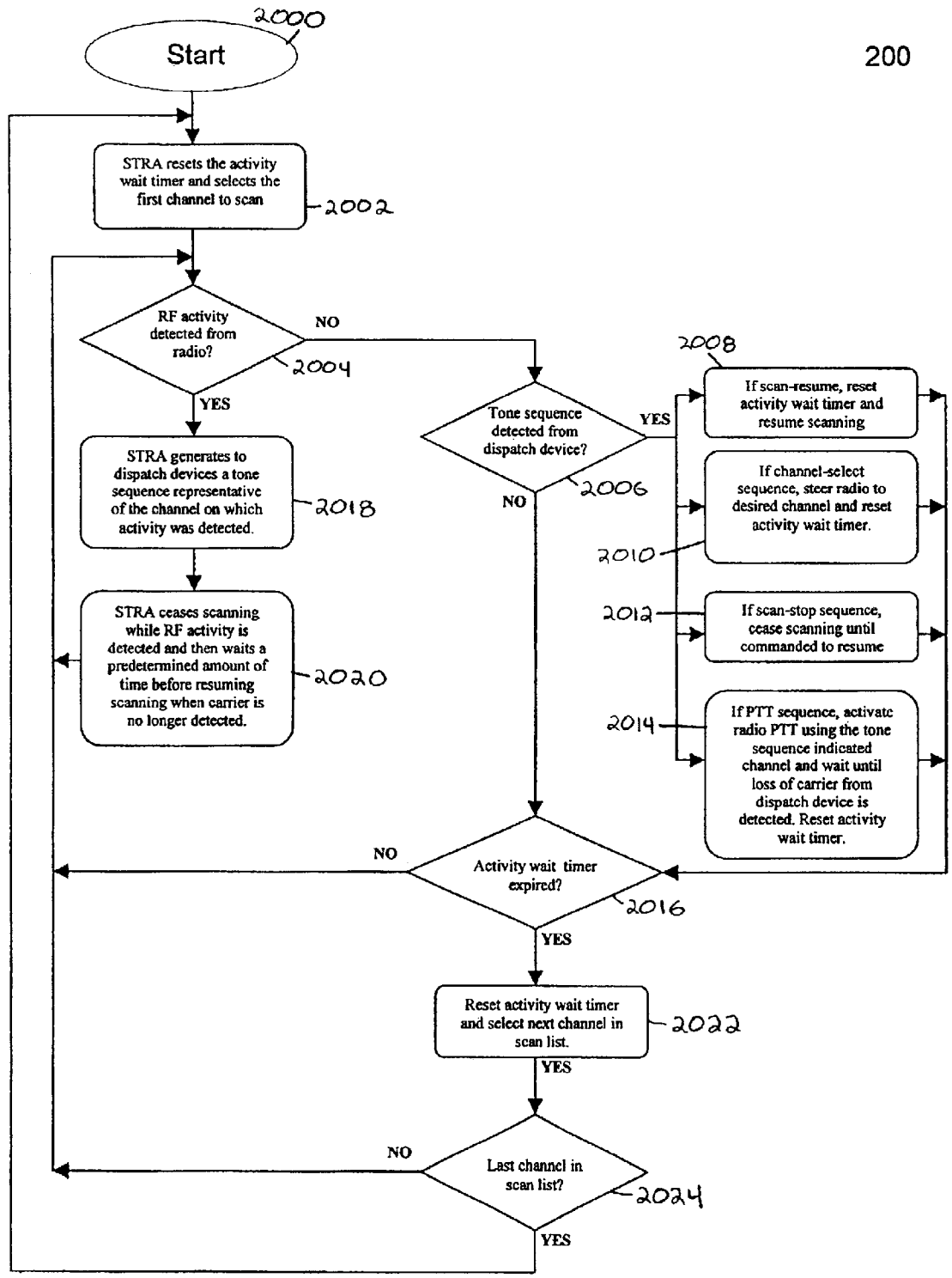
FIG. 2 illustrates a flow diagram of a method for operating a scanning tone remote adapter in accordance with an embodiment of the present invention.

FIG. 2 illustrates a flow diagram of a method for operating the scanning tone remote adapter 2 in accordance with an embodiment of the present invention. The method illustrated in FIG. 2 is a method for using the scanning tone remote adapter 2 in the radio dispatch system 100. It presumes that at least one or more remote dispatch devices 10 exists with an optional local control device 6 attached to scanning to remote adapter 2.

The method of FIG. 2 begins with step 2000, a power up/reset step in which diagnostic tests are performed to verify that general power up conditions exist within scanning tone remote adapter 2. In step 2002, scanning tone remote adapter (STRA) 2 resets an activity wait timer and selects the first channel to scan. Channels can be scanned according to different methods, i.e., according to usage or preferred channel activity or a random order, or other programmable scanning method that can be implemented via the scanning tone remote adapter and radio 4. In step 2004, scanning tone remote adapter 2 checks to see if RF activity is detected from radio 4. Radio 4, as it is scanning from channel to channel, is looking for the presence or activity of a carrier frequency that corresponds to a channel. When RF activities are detected that correspond to a channel, method 200 proceeds to step 2018 ("Yes" path from step 2004).

In step 2018, scanning tone remote adapter 2 generates a control tone sequence representative of the channel on which RF activity was detected and which is then transmitted to remote dispatch devices 10a–10j. In this manner, scanning tone remote adapter 2 informs remote dispatch devices 10a–10j that some activity has occurred on a particular channel. Audio that is received and demodulated at the STRA 2 is transmitted to all remote dispatch devices 10a–10j, and local control device 6, if attached. If a particular remote dispatch device 10a–10j is operating, the received and demodulated audio signal is broadcast on the particular remote dispatch device's speakers. If a remote dispatch device 10a–10j is transmitting operator audio to scanning tone remote adapter 2 and thus to radio 4 for broadcast, the operator's voice is likewise heard at each remote dispatch device 10a–10j and local control device 6.

The method then proceeds to step 2020 wherein scanning tone remote adapter 2 controls the radio 4 to cease scanning while RF activity is detected. The STRA 2 waits a predetermined amount of time before instructing the radio 4 to resume scanning when the carrier is no longer detected. As long as a carrier has been detected (e.g., RF activity is occurring on a particular channel), scanning is deferred since the received audio is assumed to be of importance to users of the remote dispatch devices 10a–10j or local control device 6. When the RF carrier is no longer detected, method 200 proceeds to step 2004 from step 2020, where STRA 2 again looks for RF activity from radio 4.

Referring again to step 2004, if no RF activity is detected from radio 4 ("No" path from decision step 2004), method 200 proceeds to decision step 2006. Scanning tone remote adapter 2 then determines whether a control tone sequence has been detected from any remote dispatch devices 10a–10j. If a tone sequence has been detected from any remote dispatch devices 10a–10j ("Yes" path from decision step 2006), then 1 of 4 activities can ensue.

The first activity occurs in step 2008. If the control tone sequence indicates a scan-resume activity, scanning tone remote adapter 2 will reset its activity wait timer and instruct the radio 4 to resume scanning. If, however, the control tone sequence detected in step 2006 indicates a channel select sequence, then scanning remote tone adapter 2 will tune the radio 4 to the desired channel and reset the activity wait timer. This is shown in step 2010. Alternatively, in step 2012, if the control tone sequence detected in step 2006 indicates a scan-stop sequence, then scanning tone remote adapter 2 instructs the radio 4 to cease scanning until commanded to resume. And lastly, in step 2014, if the control tone sequence detected in step 2006 indicates a push-to-talk sequence, scanning tone remote adapter 4 activates the radio 4 push-to-talk function using the control tone sequence indicated channel and waits until a loss of carrier from remote dispatch device 10 is detected. The loss of carrier activity from remote dispatch device 10 indicates "talking" has ceased. This activity also causes the activity wait timer to be reset.

Following steps 2008, 2010, 2012, 2014, and the "No" path from decision step 2006 (i.e., no control tone sequence has been detected from a remote dispatch device 10), method 200 proceeds to decision step 2016. In decision step 2016, scanning tone remote adapter 2 determines if the activity wait timer has expired. If the activity wait timer has not expired ("No" path from decision step 2016), then the scanning tone remote adapter 2 proceeds to step 2004 and again searches for RF activity from radio 4. If, however, the activity wait timer has expired ("Yes" path from decision step 2016), then method 200 proceeds to step 2022 in which the scanning tone remote adapter 2 resets the activity wait timer and instructs the radio 4 to select the next channel in the scan list. Once the next channel has been selected and the activity timer reset, method 200 proceeds to decision step 2024. If the radio has not tuned itself to the last channel in the scan list ("No" path from decision step 2024), method 200 proceeds again to step 2004 to where the STRA 2 determines if RF activity has been detected from radio 4. If, however, the last channel on the scan list has been scanned ("Yes" path decision from decision step 2024), then the scanning tone remote adapter 2 resets the activity wait timer, as indicated in step 2002, and instructs the radio 4 to select the first channel on the scan list to scan.

Figure 3:
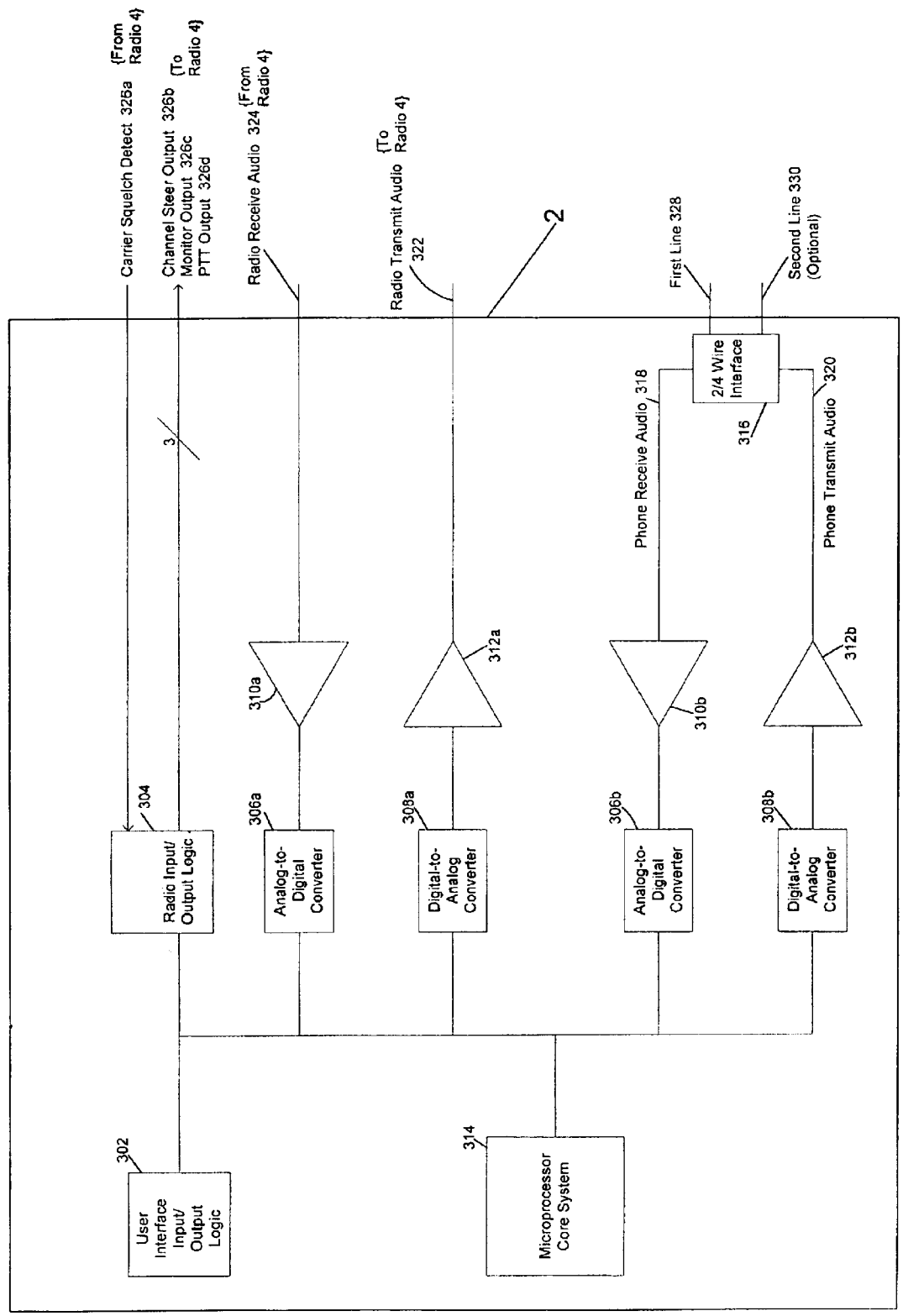
FIG. 3 illustrates a schematic block diagram of a scanning tone remote adapter constructed in accordance with an embodiment of the present invention.

FIG. 3 illustrates a schematic block diagram of the scanning tone remote adapter 2. The scanning tone remote adapter 2 preferably uses, but is not limited to, a digital signal processor (DSP) for accurate and fast control tone encoding/decoding and audio filtering. The user interface input/output logic block 302 of FIG. 3 comprises several active and passive devices including, but not limited to, LED indicators, push buttons and program switches used to control several operational aspects of the scanning tone remote adapter 2. In another embodiment of the present invention, the program switches can be replaced with a nonvolatile memory that is programmed to control the operational aspects of the scanning tone remote adapter 2. The user interface of the scanning tone remote adapter 2 is simplistic in this implementation, but could, however, be easily modified to include other types of devices to suit the specific user application.

The microprocessor core system 314 comprises several active and passive devices that allows the processing of audio, the generation and detection of control tone sequences and signals to control the input and output logic circuitry (part of block 302). There are four control tone sequences received by the microprocessor core system 314 from remote dispatch devices 10. These are: (1) scan-resume control tone sequences; (2) scan-stop control tone sequences; (3) radio channel select control tone sequences; and (4) radio push-to-talk (PTT) control tone sequences. Also, there is one control tone sequence that microprocessor core system 314 outputs to the remote dispatch devices 10, and that is the channel output asserted control tone sequence. Each will be described in greater detail below.

When the carrier squelch detect signal 326a of the radio input/input output logic 304 is asserted by the radio 4 indicating valid received audio, the microprocessor core system 314 of the STRA 2 generates and routes a channel output asserted control tone sequence to the first line 328 (or optionally the second line 330) indicating the current assertion of the channel steer outputs 326b. "Current assertion" refers to the current radio channel that is receiving radio traffic, or the channel selected by a remote dispatch device 10 to transmit audio on. Carrier squelch detect signal 326a is a signal generated by the radio 4 alerting the scanning tone remote adapter 2 to the presence of received audio on a radio channel. The channel output asserted control tone sequence is generated digitally by the microprocessor core system 314 and routed to the appropriate phone lines via the digital-to-analog converter 308b, gain compensation block 312b and 2/4 wire interface 316. After completion of the channel output asserted control tone sequence, the digitized radio-receive audio signal 324 acquired from analog-to-digital converter 306a, is routed to the first phone line 328 (or optionally second phone line 330) via the digital-to-analog converter 308b, gain compensation block 312b and 2/4 wire interface 316. The digitized radio-receive audio signal 324 will continue to be routed to the appropriate phone lines until the carrier squelch detect signal 326a is no longer asserted by the radio 4. After the loss of the carrier squelch detect signal 326a, the scanning tone remote adapter 2 eithers halt scanning by the radio 4 until a scan-resume control tone sequence is received (shown in FIG. 2 as step 2008), or resumes the scanning by radio 4 (shown in FIG. 2, step 2004), after a predetermined amount of time according to the program switches found in the user interface input/output logic 302.

Control tone sequences and phone-line audio from the remote dispatch devices 10 are received from the first phone line 328 (or the second phone line 330, as appropriate) and routed to the 2/4 wire interface 316, phone-line gain compensation circuitry 310b and the analog-to-digital converter 306b, where the audio is digitized for processing by the microprocessor core system 314. The microprocessor core system 314 analyzes the received phone-line audio for a valid control tone sequence per FIG. 2, step 2006. Upon proper detection and decoding of valid phone-line control tones, the microprocessor core system 314 performs certain actions as shown in FIG. 2, steps 2008, 2010, 2012, or 2014.

When the microprocessor core system 314 detects a scan-resume control tone sequence (shown in FIG. 2, step 2008, or upon a power-up condition), the microprocessor core system 314 instructs the radio 4 to resume scanning, and asserts the channel steer outputs 326b of the radio input/output logic 304 in sequence at a predetermined rate according to the settings of user switches found in the user interface input/output logic 302. The scanning tone remote adapter 2 continues to operate the radio 4 in scan mode until the carrier squelch detect signal 326a of the radio input/output logic 304 is asserted or until a scan-stop control tone sequence (carried on the first or second phone lines 328, 330) requesting the scanning tone remote adapter 2 to cease the scanning is detected. The scan-stop control tone sequence is discussed in greater detail below.

When the microprocessor core system 314 detects a radio channel-select control tone sequence (shown in FIG. 2, step 2010), the microprocessor core system 314 instructs radio 4 to cease scanning. The microprocessor core system 314 then generates and routes a channel output asserted control tone sequence to the first phone line 328 (or the second phone line 330, as appropriate) indicating the current assertion of the channel steer outputs 326b. The scanning tone remote adapter 2 then instructs the radio 4 to cease scanning until a scan-resume control tone sequence is received (shown in FIG. 2, step 2008).

When the microprocessor core system 314 detects a scan-stop control tone sequence (shown in FIG. 2, step 2012) the microprocessor core system 314 generates and routes a channel output asserted control tone sequence to the first phone line 328 (or the second phone line 330, as appropriate) indicating the current assertion of the channel steer outputs 326b. The scanning tone remote adapter 2 then instructs the radio 4 to cease scanning until a scan-resume control tone sequence is received (shown in FIG. 2, step 2008). When the microprocessor core system 314 detects a radio PTT control tone sequence (shown in FIG. 2, step 2014), radio transmit audio is provided to the radio transmit audio line 322 via digital-to-analog converter 308a and gain compensation block 312a. The audio is transmitted, along with the control tone sequence, on either first line 328 or second line 330. The microprocessor core system 314 asserts the channel steer outputs 326b according to the control tone sequence decoded from the received radio PTT control tone sequence, and then asserts the radio PTT output signal 326d to instruct the radio 4 to transmit the audio. The microprocessor core system 314 continues to analyze the first or second line audio until a loss of transmit carrier from the remote dispatch device is detected, indicating that the dispatcher has ceased transmission. Upon loss of the transmit carrier signal, the microprocessor core system 314 ceases routing the radio transmit audio signal through the radio transmit audio line 322 to the radio 4, and also stops asserting the radio PTT output signal 326d.

Figure 4:
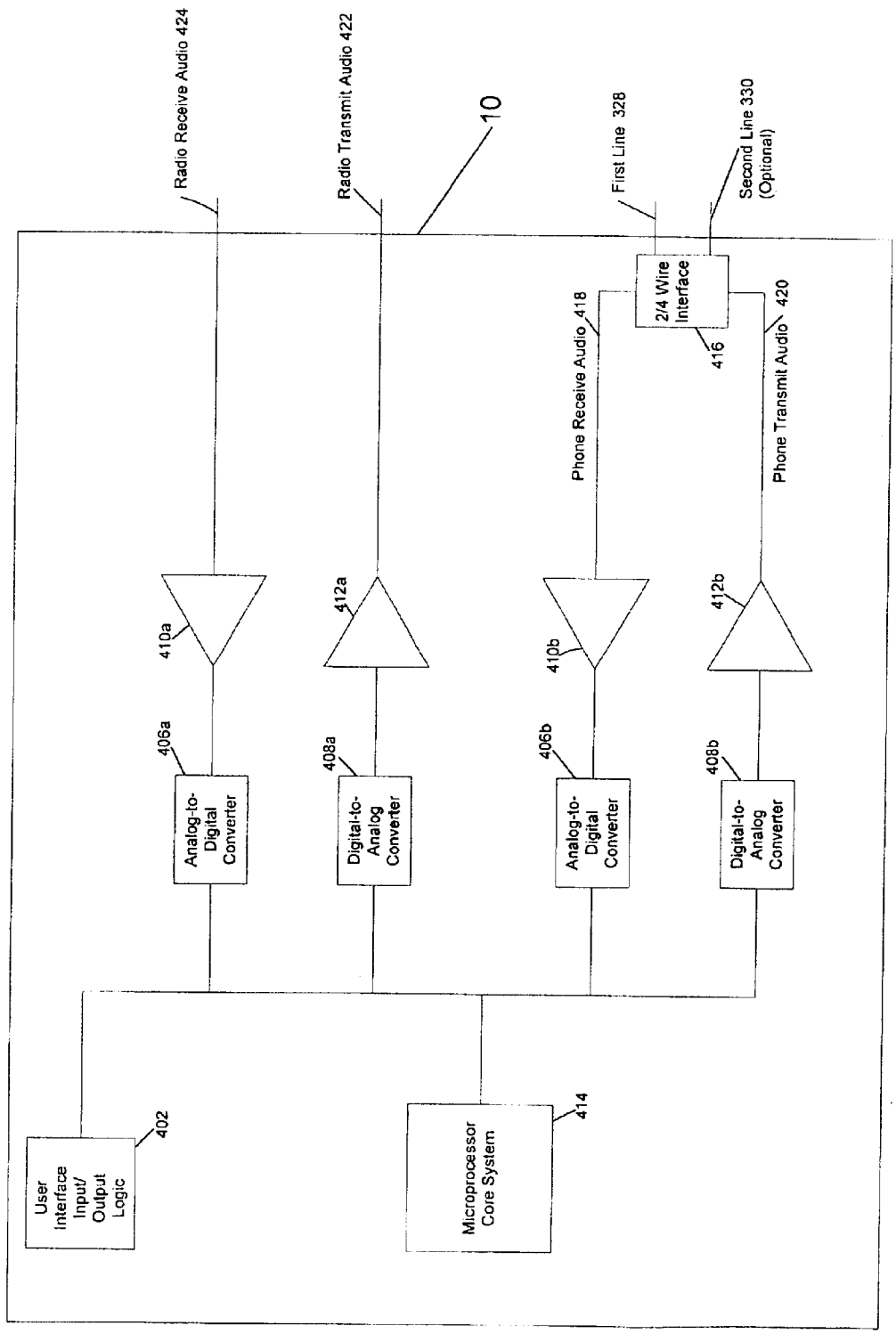
FIG. 4 illustrates a schematic block diagram of a local remote dispatch device constructed in accordance with an embodiment of the present invention.
Figure 5:
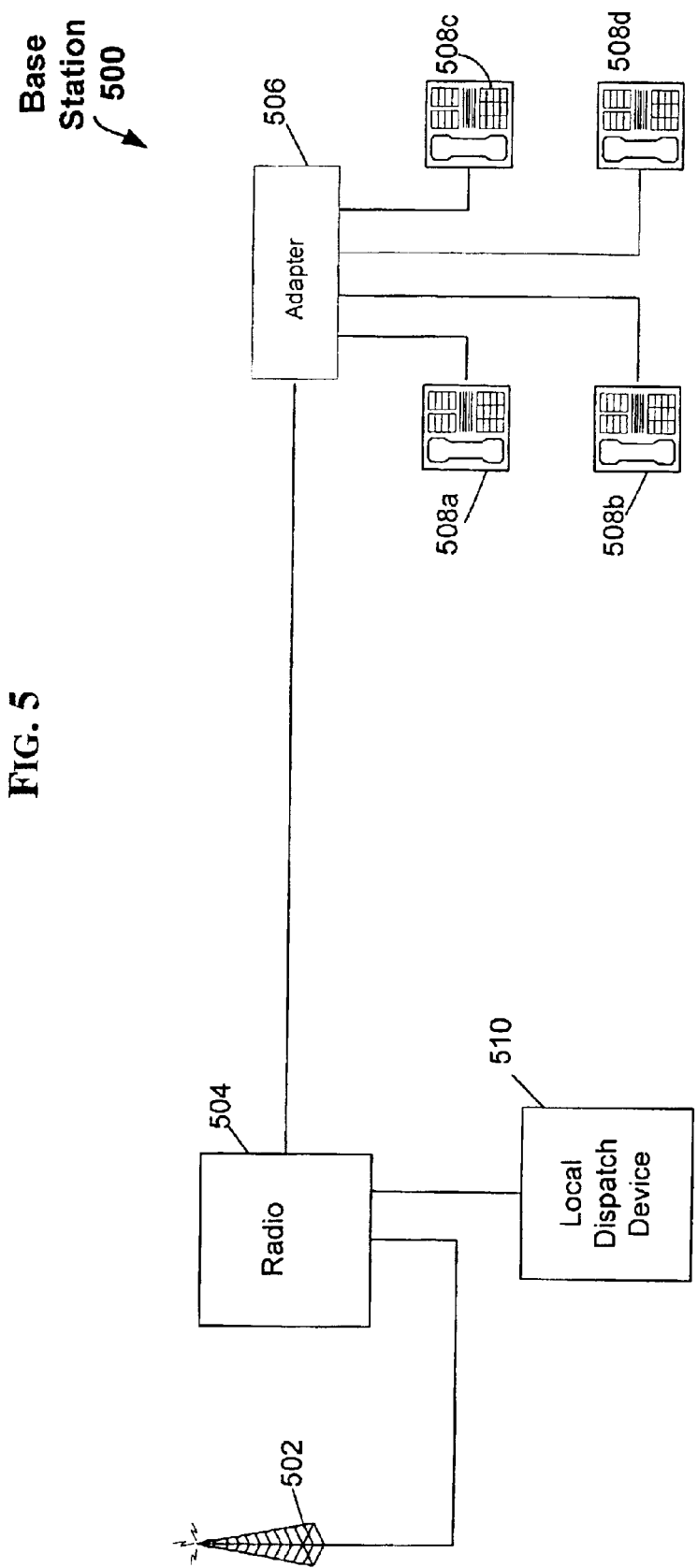
FIG. 5 illustrates a block diagram of a conventional radio dispatch system.

FIG. 4 is a block diagram of a remote dispatch device 10 in accordance with an embodiment of the invention. The remote dispatch device 10 shown in FIG. 4 has many of the same features of the scanning tone remote adapter 2 as shown in FIG. 3. The main differences are: (1) the remote dispatch device 10 does not interface directly with the radio 4, so there is no radio input/output logic interface 304 and none of the signals associated with those lines; and (2) there is an audio interface for transmitting and listening to the audio. This latter feature is not shown in FIG. 4.

Remote dispatch device 10 directs operation of radio 4 through scanning tone remote adapter 2 via the first and second lines 328, 330, as discussed above. For example, any of the remote dispatch devices 10 can cause a scan-resume control tone sequence to be output on the appropriate line, 328, 330 to the scanning tone remote adapter 2. Similarly, any of the remote dispatch devices 10 can cause a scan-stop control tone sequence to be output on the same lines 328, 330. These signals are generated in the microprocessor core system 414 and routed through digital to analog converter 408b (where the signal is converted from a digital signal to an analog signal) to gain compensation block 412b, and output through 2/4 wire interface 416. There, signals are transmitted through one or more punch blocks 8 and are received by the scanning tone remote adapter 2.

The control tone sequence signals that can be generated by the remote dispatch devices 10 are preferably the scan-resume control tone sequence, the radio channel-select control tone sequence, the scan-stop control tone sequence and the radio PTT control tone sequence. Any remote dispatch device 10 can receive and properly decode the control tone sequences transmitted from other remote dispatch devices 10, as well as the channel output asserted control tone sequence generated by the scanning tone remote adapter 2. The latter control tone sequence, as described above, causes the remote dispatch devices 10 to not to attempt to assert control of the radio.

The STRA 2 can be a model ITS 2000S Tone Remote Scan Adapter, available from GAI-Tronics® Corporation, Reading Pa., 19607. The dispatch devices can be a Model IPE2500A Paging Encoder/Desktop Controller available from GAI-Tronics® Corporation, Reading Pa., 19607.

The present invention has been described with reference to certain exemplary embodiment thereof. However, it will be readily apparent to those skilled in the art that it is possible to embody the invention in specific forms other than those of the exemplary embodiment described above. This may be done without departing from the spirit and scope of the invention. The exemplary embodiment is merely illustrative and should not be considered restrictive in any way. The scope of the invention is defined by the appended claims and their equivalents, rather than by the preceding description.

What is claimed is:

1. A land mobile radio dispatch system comprising:
   a radio communication system comprising a configuration for scanning radio frequency (RF) channels for an RF activity:
   a scanning tone remote adapter; and
   at least one remote dispatch device;
   wherein the scanning tone remote adapter is configured to:
      receive a first communication system status signal from the radio communication system, the first communication system status signal comprising a first signal indicative of a presence of the RF activity on at least one of the channels;
      transmit a second communication system status signal to the at least one remote dispatch device, the second communication system status signal comprising a second signal indicative of the RF activity on the at least one of the channels;
      receive a first communication system command signal from at least one remote dispatch device, the first communication system command signal comprising a third signal indicative of an external control parameter to control the scanning; and
      transmit a second communication system command signal to the radio communication system, the second communication system command signal comprising a fourth signal indicative of the external control parameter.

2. The land mobile radio dispatch system according to claim 1, further comprising a local control device configured to receive the second communication system status signal, and to transmit the first communication system command signal.

3. The land mobile radio dispatch system according to claim 2, wherein the scanning tone remote adapter is configured to receive the first set of radio communication system command signals from the at least one remote dispatch device or from the local control device.

4. The land mobile radio dispatch system according to claim 3, wherein the first communication command signal comprises digitally encoded analog signals.

5. The land mobile radio dispatch system according to claim 3, wherein the second communication status signal comprises digitally encoded analog signals.

6. The land mobile radio dispatch system according to claim 1 wherein the radio communication system comprises:
   a radio tower; and
   a radio transceiver.

7. The land mobile radio dispatch system according to claim 1, further comprising a network connecting the at least one remote dispatch device to at least one of: one or more other remote dispatch devices, one or more multiplexors, and the scanning tone remote adapter.

8. The land mobile radio dispatch system according to claim 7, wherein the network comprises a single pair of wires.

9. The land mobile radio dispatch system according to claim 7, wherein the network comprises a leased telephone line.

10. The land mobile radio dispatch system according to claim 7, wherein the network comprises a LAN.

11. The land mobile radio dispatch system according to claim 7, wherein the network comprises a WAN.

12. The land mobile radio dispatch system according to claim 1, wherein at least one of the first and second communication system status signals comprises a channel-selected radio communication system status signal.

13. The land mobile radio dispatch system according to claim 1, wherein at least one of the first and second communication system status signals comprises a broadcast-status radio communication system status signal.

14. The land mobile radio dispatch system according to claim 1, wherein at least one of the first and second communication system status signals comprises a signal-received radio communication system status signal.

15. The land mobile radio dispatch system according to claim 1, wherein at least one of the first and second communication system status signals comprises a self-test radio communication system status signal.

16. The land mobile radio dispatch system according to claim 1, wherein at least one of the first and second communication system status signals comprises a scan-mode radio communication system status signal.

17. The land mobile radio dispatch system according to claim 16, wherein the scan-mode radio communication system status signal comprises a scan-up scan-mode radio communication system status signal.

18. The land mobile radio dispatch system according to claim 16, wherein the scan-mode radio communication system status signal comprises a scan-down scan-mode radio communication system status signal.

19. The land mobile radio dispatch system according to claim 16, wherein the scan-mode radio communication system status signal comprises an end-scan scan-mode radio communication system status signal.

20. The land mobile radio dispatch system according to claim 1 wherein at least one of the first and second communication system command signals comprises a select-channel radio communication system command signal.

21. The land mobile radio dispatch system according to claim 1 wherein at least one of the first and second communication system command signals comprises a broadcast radio communication system command signal.

22. The land mobile radio dispatch system according to claim 1 wherein at least one of the first and second communication system command signals comprises a status-check radio communication system command signal.

23. The land mobile radio dispatch system according to claim 1 wherein at least one of the first and second communication system command signals comprises a scan-mode radio communication system command signal.

24. The land mobile radio dispatch system according to claim 23, wherein the scan-mode radio communication system command signal comprises a scan-up scan-mode radio communication system command signal.

25. The land mobile radio dispatch system according to claim 23, wherein the scan-mode radio communication system command signal comprises a scan-down scan-mode radio communication system command signal.

26. The land mobile radio dispatch system according to claim 23, wherein the scan-mode radio communication system command signal comprises an end-scan scan-mode radio communication system command signal.

27. A method of operation for a land mobile radio dispatch system comprising a radio communication system configured for scanning radio frequency (RF) channels for an RF activity, and to receive information from, and to transmit information to, at least one remote dispatch device, the method comprising:

scanning the radio frequency (RF) channels for the RF activity;

first determining a presence of an RF activity on at least one of the RF channels;

if the first determining indicates that an RF carrier-present signal is present on at least one of the RF channels, generating an RF carrier-present status signal and ceasing the scanning for at least a first predetermined amount of time; and if the first determining indicates that an RF carrier-present signal is not present on the RF channel, second determining a presence of communication system command signal from the at least one remote dispatch device, the communication system command signal comprising a signal indicative of an external control parameter to control the scanning.

28. The method according to claim 27, further comprising:

transmitting the RF carrier-present status signal at least one of: the at least one remote dispatch device and a local control device; and resuming the scanning when the RF carrier-present signal is no longer present.

29. The method according to claim 27, further comprising:

if the communication system command signal from the at least one remote dispatch device is not present after a second predetermined period of time repeating the first determining; and if a communication system command signal from the at least one remote dispatch device is present, controlling the scanning based on the external control parameter.

30. The method according to claim 29, further comprising:

setting an elapsed time to the second predetermined time period; and the communication system command signal from the at least one remote dispatch device is not present after the second predetermined time period, resetting the elapsed time to the predetermined time period.

31. The method according to claim 30, wherein the scanning comprises sequentially scanning the radio frequency (RF) channels for the RF activity, the method further comprising:

performing the first determining until the second predetermined time period;

after the second predetermined time period, performing the resetting of the elapsed time to the predetermined time period, selecting a sequentially next channel of the RF channels, and determining whether the sequentially next channel is a sequentially last channel.

32. The method according to claim 31, further comprising:

if the sequentially next channel is the last channel, performing the resetting of the elapsed time to the second predetermined time period and selecting a sequentially first channel of the RF channels for the scanning.

33. The method according to claim 31, further comprising arranging the RF channels in a channel scan list.

34. The method according to claim 29, where the controlling of the scanning comprises at least one of:

resetting a time to perform the scanning to a value less than the second predetermined time period and resuming the scanning if the signal indicative of the external control parameter comprises a scan-resume tone sequence;

resetting a time to perform the scanning to a value less than the second predetermined time period and selecting a desired channel for the scanning if the signal indicative of the external control parameter comprises a channel-select tone sequence;

resetting a time to perform the scanning to a value less than the second predetermined time period and activating a radio push-to-talk sequence on a channel indicated in the communication system command signal after a loss-of-carrier signal has been detected from the at least one remote dispatch device, if the signal indicative of the external control parameter comprises a push-to-talk tone sequence; and ceasing scanning if the signal indicative of the external control parameter comprises a scan-stop signal.

35. The method according to claim 29, wherein determining whether the second predetermined time period has elapsed comprises performing a determination by referencing an activity wait timer.

* * * * *